May 2, 1961  P. R. HUGHES ET AL  2,982,374
LIQUID STORAGE TANK FOR AIRCRAFT
Filed Feb. 25, 1959  3 Sheets-Sheet 1

INVENTORS
PAUL R. HUGHES
WALTER C. KLANK JR.
BY JEBeringer
Their ATTORNEY

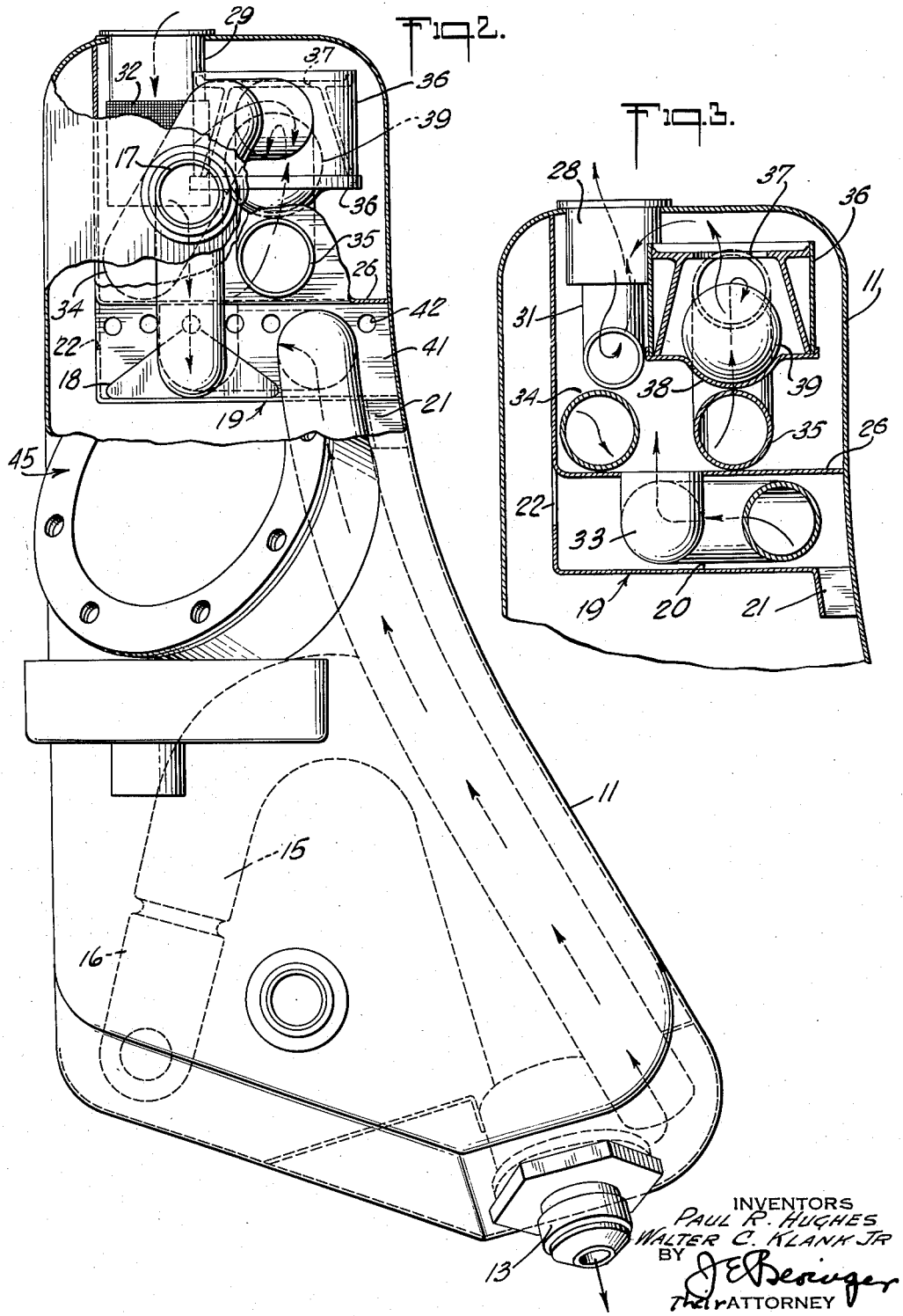

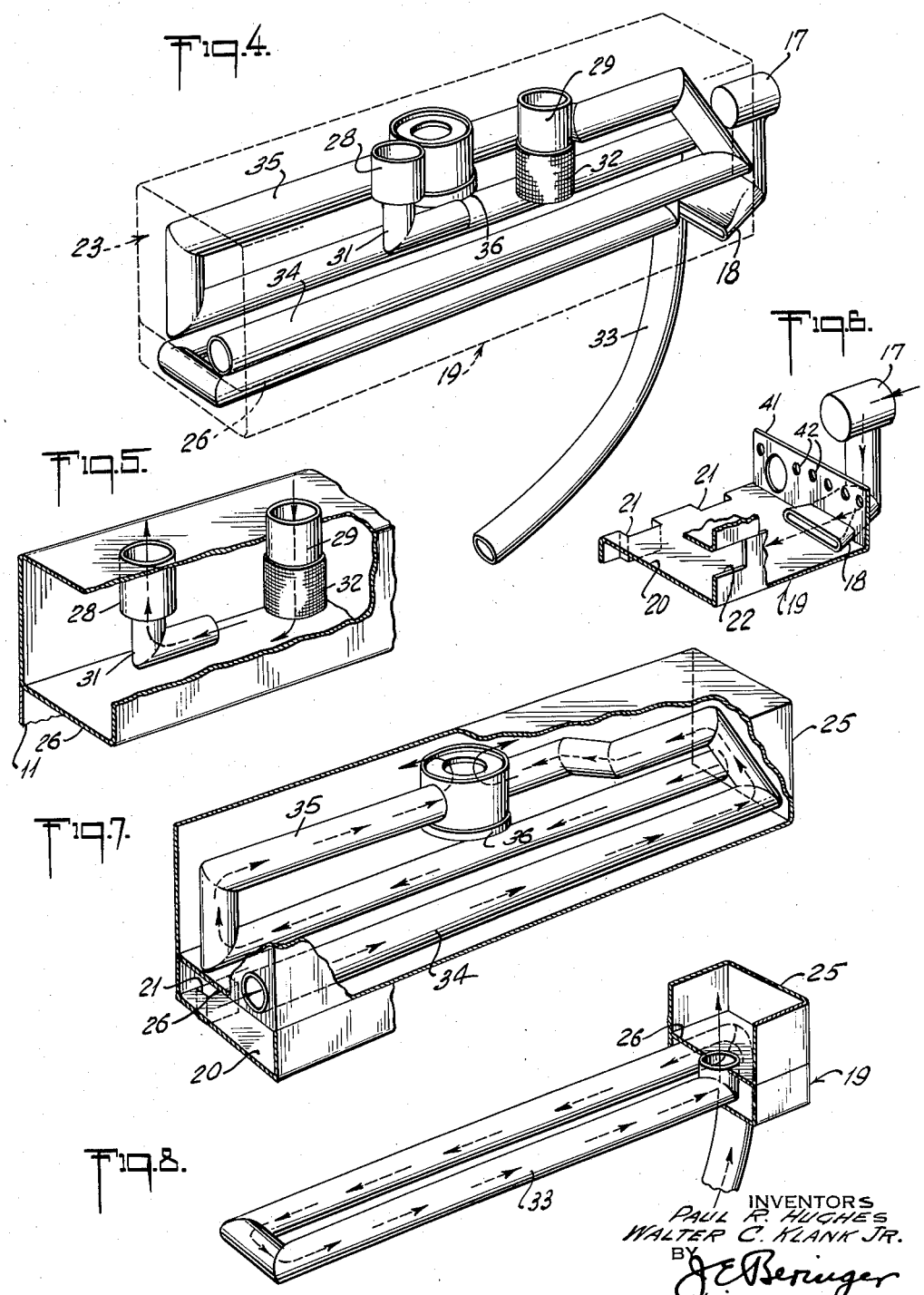

United States Patent Office 2,982,374
Patented May 2, 1961

2,982,374

LIQUID STORAGE TANK FOR AIRCRAFT

Paul R. Hughes and Walter C. Klank, Jr., Dayton, Ohio, assignors to United Aircraft Products, Inc., Dayton, Ohio, a corporation of Ohio Filed Feb. 25, 1959, Ser. No. 795,510

4 Claims. (Cl. 183—2.5)

This invention relates to liquid storage tanks for aircraft wherein an aerated liquid is returned for storage and reuse. Although not so limited, the invention has special reference to tanks interposed in and forming a part of a system circulating engine lubricating oil. As is well known, the lubricating oil is returned to the storage tank from the engine under conditions entraining substantial amounts of air with the oil. It is desirable to separate out this entrained air before the oil is again withdrawn from the tank for delivery to the engine, since, if it is not, the supplied oil is poorly conditioned for lubrication and may cause pump cavitation.

An object of the instant invention is to incorporate in the design of a tank as described efficiently acting means both to deaerate the returning oil and quickly and easily to vent the released air.

Another object of the invention is to provide a deaerating and venting system as described operable in a wide range of flight attitudes and conditions, including inverted flight and negative gravity loadings.

A further object of the invention is to provide a generally new deaerating baffle and vent tank assembly for use in a storage tank as described.

Still another object of the invention is to present a vent tank capable of receiving and venting a supplemental supply of air and of removing and returning to the tank proper all oil or liquid entrained with such air.

Other objects and structural details of the invention will appear from the following description when read in connection with the accompanying drawings, wherein:

Fig. 2 is a view in end elevation, similar to Fig. 1, partly broken away;

Fig. 3 is a fragmentary view in cross-section, taken substantially along the line 3—3 of Fig. 1;

Fig. 4 is a detail view in perspective of the several vent tubes and connections, together with the return oil flow means;

Fig. 5 is a detail view showing the connections to receive a supplemental air supply into the vent tank and to release it therefrom;

Fig. 6 is a detail view in perspective showing the manner in which liquid flow is directed to the deaerating baffle;

Fig. 7 is a view in perspective similar to Fig. 4, showing vent tube connections which are a part of the assembly comprising the vent tank and deaerating baffle; and Fig. 8 is a detail view in perspective of the means connecting the vent tank to the normal lower portion of the tank interior.

Figure 1:
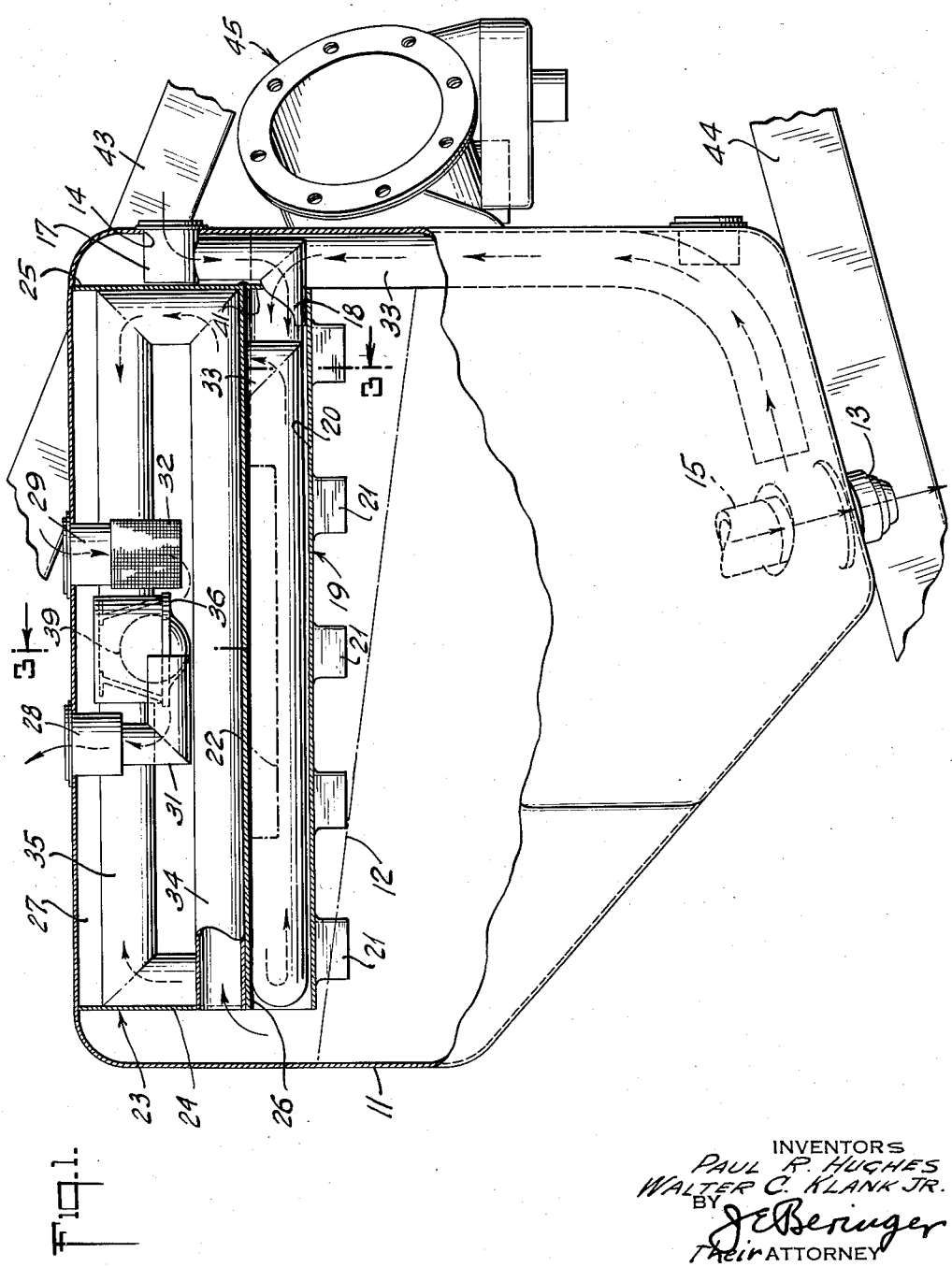
Fig. 1 is a view in side elevation, partly broken away, of a liquid storage tank in accordance with the illustrated embodiment of the invention.

Referring to the drawings, a storage tank in accordance with the illustrated embodiment of the invention comprises a shell 11 installed in an aircraft to occupy normally a generally upright position as illustrated in Fig. 1 in a normal or level flight attitude. Diving, climbing and inverted flight attitudes will find the tank in appropriately tilted or inverted positions. The tank shell 11 contains a body of oil for supply to the engine lubrication system. The tank is only partly filled, the normal liquid level at ground attitude being indicated at 12. Oil flow out of the tank is by way of a liquid outlet 13 in the bottom thereof. Return flow from the engine to the tank is by way of an inlet opening 14 in the upper part of the tank above the liquid level 12. Since the tank in use assumes varying attitudes in relation to the earth surface it is useful for purposes of description to consider that the tank interior has a normal upper portion and a normal lower portion even though these positions may at times be reversed in terms of actual position relative to the earth surface. Thus, the outlet 13 is in what is referred to as the normal lower portion of the tank since it is at the bottom of the tank when the aircraft is in a level flight attitude. Similarly, the inlet 14 is in the normal upper portion of the tank since it is at or near the top of the tank when the tank is in a level flight attitude.

Within the tank 11 is a flexible pickup tube 15 which at its one end communicates with outlet opening 13. The opposite end of such tube carries a weight 16 and is in free communication with the tank interior. The outer free end of the flexible tube 15 accordingly tends to seek the lowest part of the tank interior, is submerged in the contained body of oil irrespective of flight attitude and accordingly insures a continuing supply of oil to the outlet 13.

Installed in the inlet opening 14 is one end of a duct 17 which lies within the shell 11 and extends downwardly a short distance therein, terminating in a laterally projecting wide-mouthed nozzle 18. The latter overlies one end of a deaerating baffle 19 which is horizontally disposed within the tank shell above the liquid level 12 and which offers a relatively broad and long upper surface 20 receiving the discharge from nozzle 18. The liquid flowing from the nozzle spreads out on such surface in a flat relatively shallow stream, in a condition advantageous to the release of entrained air. One longitudinal side edge of the baffle 19 is turned down as viewed in Figs. 2 and 3 to about the wall of shell 11 and is welded or otherwise secured to such wall to fix the deaerating baffle in the tank. Spaced apart indentations 21 in this turned over edge define openings or drip points through which the oil spread out on the baffle plate may descend to and join the main body of contained oil. Oil flow similarly may take place over the ends of the baffle plate, which, as seen in Fig. 1, terminate short of contact with the tank shell.

The other longitudinal side edge of the baffle plate is turned upwardly and this, in conjunction with the oppositely disposed wall of the shell 11, gives the deaerating baffle in effect a channel like shape. A cut out 22 in the described other or turned up baffle edge provides an escape for released air from the baffle, a similar escape being possible through the ends thereof. Thus, while the oil drops off the baffle into the lower portion of the tank, air separated therefrom is free to rise into the upper portion of the tank in the space above the oil level.

Also in the normal upper portion of the tank interior is a vent tank 23 in generally parallel, overlying and adjacent relation to the baffle plate 19. The vent tank is comprised of end walls 24 and 25, a bottom wall 26 and a sidewall 27, the top of the vent tank and the other side thereof being defined by the wall of shell 11 in the manner shown in Fig. 3. Installed in the upper wall or top of the vent tank 23 are cylindrical inserts 28 and 29 both affording communication of the interior of the vent tank with the exterior of the tank shell 11. Projecting inwardly of the vent tank from the cylindrical insert 28 is an angular length of tube 31, open at its end to communicate the insert with a point which desirably is close to the volumetric center of the tank 23. On the inner end of the insert 29 is a mesh screen 32 affording a free passage of air therethrough but providing extended surface for the collection of liquid particles. The cylindrical insert 28 defines the vent outlet of the tank and may be communicated in any suitable manner overboard or to a place of low pressure. The cylindrical insert 29 serves as an inlet for sump air, which air is vented through the tank 23 because it contains or entrains a quantity of oil in the form of fine liquid particles. These particles tend to impinge upon the surface of screen 32 and to adhere thereto while the air continues independently through the screen and into the interior of tank 23 where it is vented by way of outlet 28. As the oil collects on the screen 32 the excess drips to the bottom of the tank 23 and from there is allowed to flow to the main body of contained oil in the tank by way of a downwardly extending tube 33 (Figs. 1 and 8) which at its one end opens into the bottom of the tank 23 and which extends at its other end into the normal lower portion of the tank shell 11.

Also within the vent tank 23 is a pair of tubes 34 and 35. The former extends through the end wall 24 of the vent tank, at its one end, to communicate with the upper part of the tank shell interior in what may be considered to be the rear thereof having regard to the direction of flight. Similarly, one end of the tube 35 opens through end wall 25 to communicate with the upper portion of the tank shell interior in what may be regarded as the forward part thereof. In normal level flight both of the open ends of the tubes 34 and 35 are uncovered by the contained body of oil so that air in the upper part of the tank shell above the oil level has free access to both tubes. In the event of a climb of the aircraft, involving a tilting motion of the tank in a generally counterclockwise direction from the position shown in Fig. 1, the open end of tube 34 will be covered by the shifting oil. The open end of tube 35 will remain open, however, and air released to the space above the oil level may be carried off through the tube 35. In a dive position, wherein the tank will be rocked or tilted in a clockwise direction from the position shown in Fig. 1, the outer end of tube 35 may be closed but the released air has freedom of access to the tube 34.

The tubes 34 and 35 are in common communication at their respectively opposite ends with the interior of a valve body 36 stationarily mounted in the vent tank 23. The body 36 is closed at its sides and bottom but open at the top thereof by virtue of a round opening 37. The bottom of the valve body 36 is indented to provide a socket 38 for a loose, relatively heavy, ball 39, the socket 38 being vertically aligned with opening 37. Under gravity influence the ball 39 normally remains in the socket 38, and, as so positioned, offers no resistance to the movement of air from the tubes 34 and 35 into the interior of valve body 36 and out of the body by way of opening 37 into the interior of vent tank 23 from which it is free to escape through vent outlet 28. Under conditions of inverted flight, however, or under flight conditions simulating an inverted attitude, the ball 39 moves under gravity influence out of the socket 38 and to a position seating in and closing the opening 37 in the valve body. Communication of the tubes 34 and 35 with the interior of the vent tank accordingly is in this position of the parts prevented. Venting of the tank interior to the vent tank 23 is not interrupted, however, but now takes place through the normally downwardly extending tube 33. Under conditions of inverted flight, or of such negative gravity loading which permits movement of the oil out of the normal button portion of the tank interior, the lower end of tube 33 is exposed and open for the admission thereto of released air.

During major changes in flight attitudes, oil may enter portions of the vent system. Oil slugging, or discharge out of the tank, is reduced to a minimum by the selective placement and use of an air chamber as represented by the vent tank 23, in series relation to the vent outlet 28. The chamber configuration is such that most of the oil slugged or admitted to the air chamber or to the tubes leading to the chamber will be trapped and allowed to drain back into the main tank. It will be noted in this connection that the tubes 34 and 35 follow an indirect path to the valve body 36. Thus, from the point of opening through the wall 24 or the wall 25 the tube 34 or 35 extends horizontally the full length of the vent tank then rises into the horizontal plane of the body 36 and extends in a reverse direction to such body. The valve body is positioned midway between the ends of the vent tank and above the planes of the main portions of the tubes 34 and 35. This configuration has the effect of inhibiting movements of oil into the vent tank by way of the tubes 34 and 35, particularly during return of the aircraft to level flight from climb or dive attitudes. Such oil as may find it possible to reach the valve body 36 is allowed to follow the same path as the air out of the opening 37 and into the vent tank interior. Here, however, it drops to the bottom of the tank and drains back into the main tank interior through tube 33. The latter similarly is formed with a circuitous configuration, as shown in Fig. 8. At the upper end thereof the tube 33 extends horizontally beneath the bottom 26 of the vent tank 23 from one end of the tank to the other and then reverses its direction, returning almost to the first end of the tank before communicating in a vertical sense through the bottom of the vent tank with the air chamber therein. This configuration, it will be understood, has a similar effect in reducing oil slugging into the vent tank particularly during movements of the aircraft into and out of an inverted flight attitude.

As previously noted, the duct 31 from vent outlet 28 communicates as closely as possible with the volumetric center of the air chamber defined by tank 23. As a result thereof, the amount of oil which tank 23 may contain, without discharging overboard through outlet 28, is approximately the same in all attitudes. By selective location of this duct a relative greater ability of the vent tank to retain oil in certain flight attitudes can be achieved, if desirable. In the present instance, since changing attitude due to roll is relatively unimportant, and to permit a central location of the valve body 36, the opening into duct 31 is centered with respect to top and bottom walls of the vent tank and with respect to the end walls, but is offset laterally or from side to side.

The convolution of the tube 33 beneath the vent tank 23 occurs in what may be considered a deaerating chamber. Thus, the deaerating baffle 19 with its upturned sides is in effect suspended from the vent tank 23, the bottom of which forms the top of a chamber having a restricted outlet therefrom. In addition to being secured along its one side edge to the shell 11, the plate 19 also is attached as by welding to the vent tank 23 at that end of the deaerating chamber receiving nozzle 18, the plate 19 is formed with an upstanding wall 41 which extends into overlapping relation to the corresponding end of the vent tank and is welded thereto. Further, the upstanding edge of the side wall of the baffle plate, on opposite sides of cut-off 22, abuts and is secured to the vent tank. The wall 41 is formed with a series of openings 42 for escape of air through that end of the deaerating chamber. In channeling the return flow into the deaerating chamber there is maintained an orderly flow essential to good deaeration and opportunity is minimized for surging, foaming or vortexing of the oil as it enters the tank. In addition, high velocity direct internal flow is presented from the return inlet to the oil outlet.

In use the tank occupies a fixed position in the aircraft, as by being fastened to engine struts 43 and 44. A fill and overflow assembly 45 is mounted to the tank exterior.

What is claimed is:

1. A liquid storage tank for aircraft wherein an aerated liquid is returned for storage and reuse, including a tank shell having outlet and return flow openings, said tank shell having normal upper and lower interior portions as defined by the normal flight attitude and further being normally only partly filled with liquid, a vent tank constructed in said shell above the normal liquid level and having restricted communication through its top with the exterior of the tank shell, said vent tank further having restricted communication at its ends with the normal upper portion of the shell interior and restricted communication at its bottom with the normal lower portion of the tank interior, the sides of said vent tank being closed, and a baffle disposed in underlying generally parallel relation to said vent tank and receiving liquid thereon from said return flow opening, the liquid spilling over into the contained body of liquid and released air rising to enter said vent tank at the ends thereof.

2. A liquid storage tank according to claim 1, characterized in that the sides of said baffle plate are turned up into contacting relation to said vent tank, said plate and said tank defining a deaerating chamber open for restricted escape of liquid and released air.

3. A liquid storage tank for aircraft wherein an aerated liquid is returned for storage and reuse, including a tank shell having outlet and return flow openings, said tank shell having normal upper and lower interior portions as defined by the normal flight attitude and further being normally only partly filled with liquid, a vent tank constructed in said shell in said normal upper portion thereof, a pair of tubes in said vent tank communicating at their one ends with the shell interior through respective ends of the vent tank and defining the sole means of communication of the vent tank with the shell interior in the normal upper portion thereof, a hollow valve body in said vent tank in common communication with the opposite ends of said tubes and having an opening in its upper end communicating the interior of said valve body with the interior of said vent tank, a valve in said body closing said opening in a position of inverted flight or under negative gravity loading, a vent outlet from said vent tank to the exterior of the tank shell, said vent outlet communicating with said vent tank close to the volumetric center thereof, further tube means communicating at its one end with the interior of said vent tank and at its other end with the normal lower portion of the shell interior, an inlet to said vent tank for air entraining liquid, and means to promote a release of liquid from such air, the released liquid dropping to the bottom of said vent tank and flowing by way of said last named tube to the lower portion of the tank shell interior.

4. A liquid storage tank for aircraft wherein an aerated liquid is returned for storage and reuse, including a tank shell having normal upper and lower interior portions as defined by the normal flight attitude and further being normally only partly filled with liquid, an outlet opening in the tank shell from the normal lower portion thereof, a flexible pickup tube able to reach into all parts of the tank shell interior to conduct liquid to said outlet, a deaerating baffle generally horizontally disposed in the tank shell interior above the normal liquid level in the normal upper portion of the tank shell, means to conduct liquid from said return flow opening to said deaerating baffle, the returned liquid flowing in a stream over said baffle for a release of entrained air and the liquid spilling from said baffle into the normal lower portion of the shell interior while released air rises into the upper portion of the tank shell interior, a vent tank arranged in said tank shell above said deaerating baffle and closed except for restricted communication with selected portions of the tank shell interior and with the exterior of the tank shell, tubes continuously open at their one ends to the tank shell interior providing said restricted communication, and means to restrict the entrance of liquid into said vent tank by way of said tubes, said last named means including a gravity operated check valve controlling communication of the opposite ends of said tubes with the interior of said vent tank and discontinuing such communication in some flight attitudes or under some flight conditions.

References Cited in the file of this patent
UNITED STATES PATENTS

| | | |
|---|---|---|
| 1,503,125 | Iddings | July 29, 1924 |
| 1,628,900 | Neilsen | May 17, 1927 |
| 2,510,098 | Geisler | June 6, 1950 |
| 2,580,530 | Diley | Jan. 1, 1952 |
| 2,793,708 | Carroll | May 28, 1957 |